(12) United States Patent
Grupido (10) Patent No.: US 8,792,222 B2
(45) Date of Patent: Jul. 29, 2014

(54) DRIVER CIRCUIT FOR AN ELECTRIC VEHICLE AND A DIAGNOSTIC METHOD

(75) Inventor: Craig William Grupido, Brighton, MI (US)

(73) Assignee: LG Chem, Ltd., Seoul (KR)

( * ) Notice: Subject to any disclaimer, the term of this patent is extended or adjusted under 35 U.S.C. 154(b) by 389 days.

(21) Appl. No.: 13/408,465

(22) Filed: Feb. 29, 2012

(65) Prior Publication Data

US 2013/0221743 A1 Aug. 29, 2013

(51) Int. Cl.
*H01H 9/00* (2006.01)
*H01H 47/00* (2006.01)
*H01H 51/22* (2006.01)

(52) U.S. Cl.
USPC .......................................... 361/160; 307/9.1

(58) Field of Classification Search
CPC .................................. H02H 9/04; H02H 3/20
USPC .......................................... 361/160; 307/9.1
See application file for complete search history.

(56) References Cited

U.S. PATENT DOCUMENTS

| | | | |
|---|---|---|---|
| 6,768,621 B2 * | 7/2004 | Amundsen et al. ......... | 361/93.1 |
| 7,586,214 B2 * | 9/2009 | Clarke et al. ............... | 307/130 |
| 8,513,953 B2 * | 8/2013 | Myoen et al. ............... | 324/538 |
| 2005/0253460 A1 * | 11/2005 | Nakanishi et al. .......... | 307/10.1 |
| 2006/0021098 A1 * | 1/2006 | Tezuka ........................ | 903/922 |
| 2007/0013231 A1 | 1/2007 | Yamashita et al. | |
| 2008/0185999 A1 * | 8/2008 | Matsukawa et al. ......... | 320/166 |
| 2009/0133671 A1 | 5/2009 | Perryman et al. | |
| 2011/0279975 A1 | 11/2011 | Shimizu et al. | |

FOREIGN PATENT DOCUMENTS

| | | |
|---|---|---|
| JP | 2006288163 A | 10/2006 |
| JP | 2009136077 A | 6/2009 |

* cited by examiner

*Primary Examiner* — Dharti Patel (74) *Attorney, Agent, or Firm* — Buckert Patent & Trademark Law Firm, P.C.; John F. Buckert (57) ABSTRACT

A driver circuit and a diagnostic method are provided. The circuit includes a first voltage driver having a first output line electrically coupled to a main contactor coil of a main contactor. The circuit further includes a microprocessor that measures a first voltage on a first voltage feedback line if the main contactor coil is not energized. The microprocessor measures a second voltage on a second voltage feedback line if the main contactor coil is not energized. The microprocessor sets a status flag equal to a fault condition value if the first voltage is greater than a threshold voltage value. Also, the microprocessor sets the status flag equal to the fault condition value if the second voltage is greater than the threshold voltage value.

15 Claims, 6 Drawing Sheets

DRIVER CIRCUIT FOR AN ELECTRIC VEHICLE AND A DIAGNOSTIC METHOD

BACKGROUND

The inventor herein has recognized a need for an improved driver circuit for an electric vehicle and a diagnostic method associated with the driver circuit.

SUMMARY

A driver circuit for an electric vehicle in accordance with an exemplary embodiment is provided. The driver circuit includes a first voltage driver having a first output line electrically coupled to a first side of a main contactor coil of a main contactor. The first voltage driver has a first voltage feedback line coupled to both the first output line and to a microprocessor. The driver circuit further includes a second voltage driver having a second output line electrically coupled to a second side of the main contactor coil. The second voltage driver further includes a second voltage feedback line coupled to both the second output line and to the microprocessor. The microprocessor is configured to measure a first voltage on the first voltage feedback line if the main contactor coil is not energized by the microprocessor. The microprocessor is further configured to measure a second voltage on the second voltage feedback line if the main contactor coil is not energized by the microprocessor. The microprocessor is further configured to set a first status flag associated with the main contactor equal to a fault condition value if the first voltage is greater than a threshold voltage value. The microprocessor is further configured to set the first status flag associated with the main contactor equal to the fault condition value if the second voltage is greater than the threshold voltage value.

A diagnostic method for a driver circuit for an electric vehicle in accordance with another exemplary embodiment is provided. The driver circuit includes a first voltage driver having a first output line electrically coupled to a first side of a main contactor coil of a main contactor. The first voltage driver has a first voltage feedback line coupled to both the first output line and to a microprocessor. The driver circuit further includes a second voltage driver having a second output line electrically coupled to a second side of the main contactor coil. The second voltage driver further includes a second voltage feedback line coupled to both the second output line and to the microprocessor. The method includes measuring a first voltage on the first voltage feedback line utilizing the microprocessor, if the main contactor coil is not energized by the microprocessor. The method further includes measuring a second voltage on the second voltage feedback line utilizing the microprocessor, if the main contactor coil is not energized by the microprocessor. The method further includes setting a first status flag associated with the main contactor equal to a fault condition value utilizing the microprocessor if the first voltage is greater than a threshold voltage value. The method further includes setting the first status flag associated with the main contactor equal to the fault condition value utilizing the microprocessor if the second voltage is greater than the threshold voltage value.

DETAILED DESCRIPTION

Figure 1:
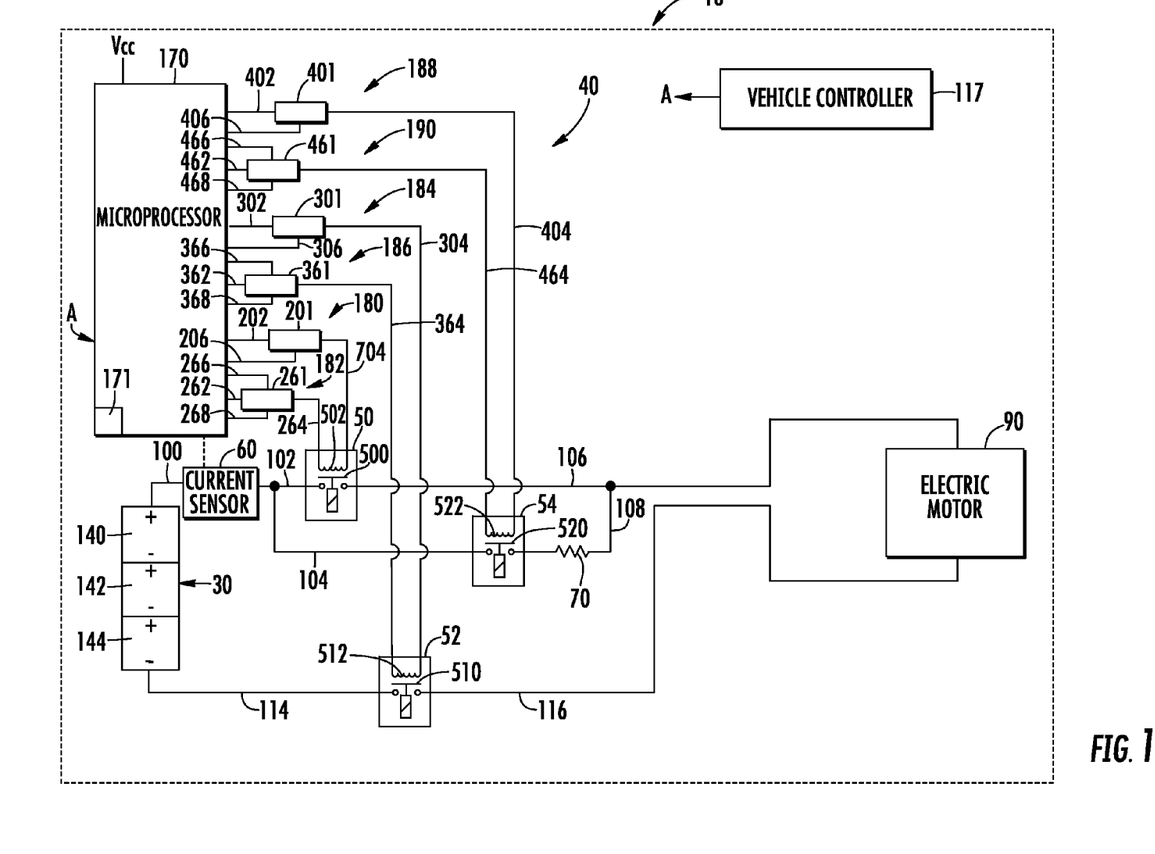
FIG. 1 is a block diagram of an electric vehicle having a driver circuit in accordance with an exemplary embodiment.
Figure 2:
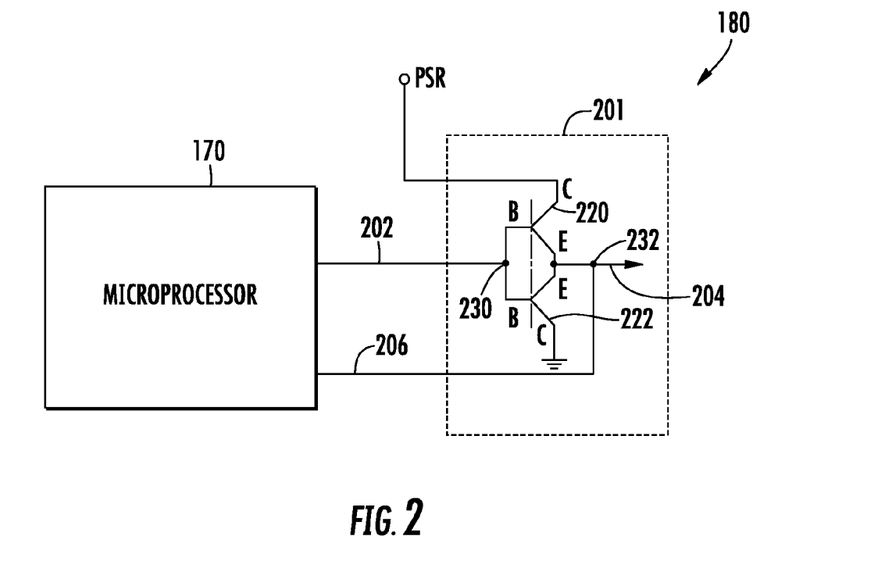
FIG. 2. is a schematic of a first voltage driver utilized in the driver circuit of FIG. 1.
Figure 3:
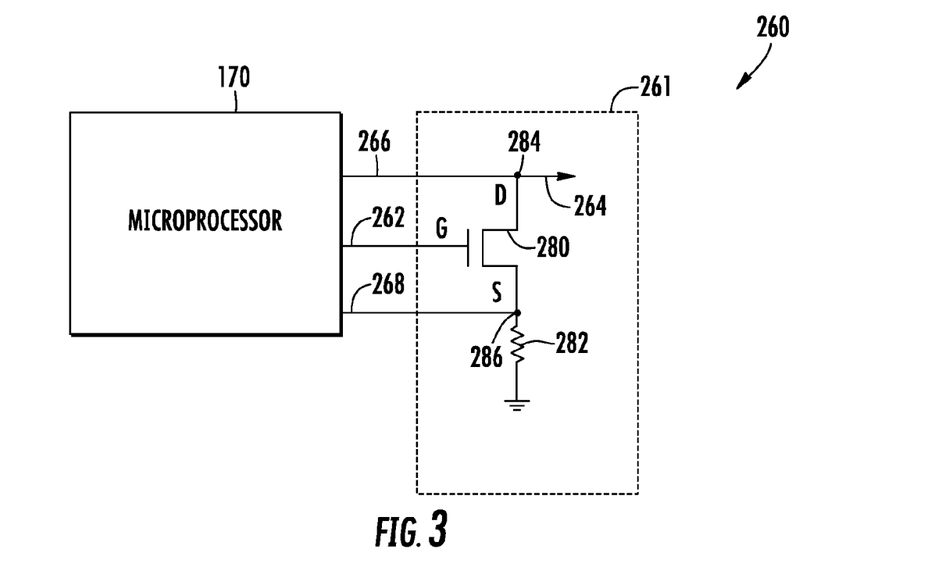
FIG. 3. is a schematic of a second voltage driver utilized in the driver circuit of FIG. 1.

Referring to FIGS. 1-3, an electric vehicle 10 having a driver circuit 40 in accordance with an exemplary embodiment is provided. The electric vehicle 10 further includes a battery pack 30, a main contactor 50, a grounding contactor 52, a pre-charge contactor 54, a current sensor 60, a resistor 70, an electric motor 90, electrical lines 100, 102, 104, 106, 108, and a vehicle controller 117. An advantage of the driver circuit 40 is that the driver circuit 40 performs a diagnostic algorithm to determine whether the driver circuit 40 has any portions with undesired voltage levels when the driver circuit 40 is not energizing the main contactor 50, the grounding contactor 52, and the pre-charge contactor 54, as will be explained in greater detail below.

The battery pack 30 is configured to output an operational voltage for operating the electric motor 90. The battery pack 30 includes battery modules 140, 142, 144 electrically coupled in series with one another.

The driver circuit 40 is configured to control operational positions of the main contactor 50, the grounding contactor 52, and the pre-charge contactor 54. The driver circuit 40 includes a microprocessor 170, a first voltage driver 180, a second voltage driver 182, a third voltage driver 184, a fourth voltage driver 186, a fifth voltage driver 188, and a sixth voltage driver 190.

The microprocessor 170 is configured to generate control signals for controlling operation of the first voltage driver 180, the second voltage driver 182, the third voltage driver 184, the fourth voltage driver 186, the fifth voltage driver 188, and the sixth voltage driver 190. The microprocessor 170 is further configured to measure voltages associated with the voltage drivers. The microprocessor 170 is further configured to set a value of a status flags associated with the driver circuit 40 to either a fault condition value or a non-fault condition value and to store the status flags in a memory device 171. The microprocessor 170 is operably coupled to a Vcc voltage source that supplies an operational voltage (e.g., 5 Volts) to the microprocessor 170.

Referring to FIGS. 1 and 2, the first voltage driver 180 and the second voltage driver 182 are utilized to energize the main contactor coil 502 to induce the contact 500 to have a closed operational position, and to de-energize the main contactor coil 502 to induce the contact 500 to have an open operational position. During operation, when the microprocessor 170 outputs high logic voltages on the first and second input lines 202, 262 to the first and second voltage drivers 180, 182, respectively, the voltage drivers 180, 182 energize the main contactor coil 502 to induce the contact 500 to have an closed operational position. Alternately, when the microprocessor 170 stops outputting the high logic voltages on either of the first and second input lines 202, 262 to the first and second voltage drivers 180, 182, respectively, the voltage drivers 180, 182 de-energize the main contactor coil 502 to induce the contact 500 to have an open operational position.

The first voltage driver 180 includes a first driver circuit 201, a first input line 202, a first output line 204, and a first voltage feedback line 206. The first input line 202 is coupled to both the microprocessor 170 and to the first driver circuit 201. The first output line 204 is electrically coupled to a first side of the main contactor coil 502. The first voltage feedback line 206 is coupled to both the first output line 204 and to the microprocessor 170.

In one exemplary embodiment, the first driver circuit 201 includes transistors 220, 222. The transistor 220 has: (i) a base (B) coupled to a node 230 that is further coupled to the microprocessor 170, (ii) a collector (C) coupled to a PSR voltage source, and (iii) an emitter coupled to a node 232 which is further coupled to the first output line 204. The transistor 222 has: (i) a base (B) coupled to the node 230 that is further coupled to the microprocessor 170, (ii) a collector (C) coupled to electrical ground, and (iii) an emitter coupled to the node 232. When the microprocessor 170 applies a high logic voltage to node 230, the transistor 220 is turned on and the transistor 22 is turned off and a voltage (e.g., 12 volts) from the PSR voltage source is applied to the node 232 and the first output line 204 which is further applied to a first end of the main contactor coil 502. Alternately, when the microprocessor 170 stops applying the high logic voltage to node 230, the transistor 220 is turned off and the transistor 222 is turned on and a ground voltage is applied to the node 232 and the first output line 204 which is further applied to the first end of the main contactor coil 502.

Referring to FIGS. 1 and 3, the second voltage driver 182 includes a second driver circuit 261, a second input line 262, a second output line 264, a second voltage feedback line 266, and a first current feedback line 268. The second input line 262 is coupled to both the microprocessor 170 and to the second driver circuit 261. The second output line 264 is electrically coupled to a second side of the main contactor coil 502. The second voltage feedback line 266 coupled to both the second output line 264 and to the microprocessor 170. When the main contactor coil 502 is energized, the second current feedback line 268 receives a signal indicative of a first current in the main contactor coil 502 and is coupled to the microprocessor 170.

In one exemplary embodiment, the second driver circuit 261 includes a transistor 280 and a resistor 282. The transistor 280 has: (i) a gate (G) coupled to the microprocessor 170, (ii) a drain (D) coupled to a node 284 that is further coupled to both the second voltage feedback line 266 and to the second output line 264, and (iii) a source (S) coupled to a resistor 282. The resistor 282 is coupled between the source (S) and electrical ground. A node 286 at a first end of the resistor 282 is further coupled to the microprocessor 170 through the feedback line 268. When the microprocessor 170 applies a high logic voltage to the gate (G), the transistor 280 turns on and allows electrical current from the main contactor coil 502 to flow through the transistor 280 and the resistor 282 to ground. Alternately, when the microprocessor 170 stops applying the high logic voltage to the gate (G), the transistor 280 turns off and does not allow electrical current to flow through the main contactor coil 502, the transistor 280, and the resistor 282.

Referring to FIG. 1, the third voltage driver 184 and the fourth voltage driver 186 are utilized to energize the grounding contactor coil 512 to induce the contact 510 to have a closed operational position, and to de-energize the grounding contactor coil 512 to induce the contact 510 to have an open operational position. During operation, when the microprocessor 170 outputs high logic voltages on the third and fourth input lines 302, 362 to the third and fourth voltage drivers 184, 186, respectively, the voltage drivers 184, 186 energize the grounding contactor coil 512 to induce the contact 510 to have a closed operational position. Alternately, when the microprocessor 170 stops outputting high logic voltages on either of the third and fourth input lines 302, 362 to the third and fourth voltage drivers 184, 186, respectively, the voltage drivers 184, 186 de-energize the grounding contactor coil 512 to induce the contact 510 to have an open operational position.

The third voltage driver 184 includes a third driver circuit 301, a third input line 302, a third output line 304, and a third voltage feedback line 306. The third input line 302 is coupled to both the microprocessor 170 and to the third driver circuit 301. The third output line 304 is electrically coupled to a first side of the grounding contactor coil 512. The third voltage feedback line 306 is coupled to both the third output line 304 and to the microprocessor 170. In one exemplary embodiment, the structure of the third driver circuit 301 is identical to the structure of the first driver circuit 201 discussed above.

The fourth voltage driver 186 includes a fourth driver circuit 361, a fourth input line 362, a fourth output line 364, a fourth voltage feedback line 366, a second current feedback line 368. The fourth input line 362 is coupled to both the microprocessor 170 and to the fourth driver circuit 361. The fourth output line 364 is electrically coupled to a second side of the grounding contactor coil 512. The fourth voltage feedback line 366 coupled to both the fourth output line 364 and to the microprocessor 170. When the grounding contactor coil 512 is energized, the second current feedback line 368 receives a signal indicative of a second current in the grounding contactor coil 512 and is coupled to the microprocessor 170.

The fifth voltage driver 188 and the sixth voltage driver 190 are utilized to energize the pre-charge contactor coil 522 to induce the contact 520 to have a closed operational position, and to de-energize the pre-charge contactor coil 522 to induce the contact 520 to have an open operational position. During operation, when the microprocessor 170 outputs high logic voltages on the fifth and sixth input lines 402, 462 to the fifth and sixth voltage drivers 188, 190, respectively, the voltage drivers 188, 190 energize the pre-charge contactor coil 522 to induce the contact 520 to have a closed operational position. Alternately, when the microprocessor 170 stops outputting high logic voltages on either of the fifth and sixth input lines 402, 462 to the fifth and sixth voltage drivers 188, 190, respectively, the voltage drivers 188, 190 de-energize the pre-charge contactor coil 522 to induce the contact 520 to have an open operational position.

The fifth voltage driver 188 includes a fifth driver circuit 401, a fifth input line 402, a fifth output line 404, and a fifth voltage feedback line 406. The fifth input line 402 is coupled to both the microprocessor 170 and to the fifth driver circuit 401. The fifth output line 404 is electrically coupled to a first side of the pre-charge contactor coil 522. The fifth voltage feedback line 406 is coupled to both the fifth output line 404 and to the microprocessor 170. In one exemplary embodiment, the structure of the fifth driver circuit 401 is identical to the structure of the first driver circuit 201 discussed above.

The sixth voltage driver 190 includes a sixth driver circuit 461, a sixth input line 462, a sixth output line 464, a sixth voltage feedback line 466, a third current feedback line 468. The sixth input line 462 is coupled to both the microprocessor 170 and to the sixth driver circuit 461. The sixth output line 464 is electrically coupled to a second side of the pre-charge contactor coil 522. The sixth voltage feedback line 466 coupled to both the sixth output line 464 and to the microprocessor 170. When the pre-charge contactor coil 522 is energized, the third current feedback line 468 receives a signal indicative of a third current in the pre-charge contactor coil 522 and is coupled to the microprocessor 170. In one exemplary embodiment, the structure of the sixth driver circuit 461 is identical to the structure of the second driver circuit 261.

The main contactor 50 is electrically coupled in series with the battery pack 30, the current sensor 60 and the electric motor 90. In particular, a positive voltage terminal of the battery pack 30 is electrically coupled to the current sensor 60 via the electrical line 100. The current sensor 60 is electrically coupled to a first end of the contact 500 of the main contactor 50 via the electrical line 102. Also, a second end of the contact 500 is electrically coupled to the electric motor 90 via the electrical line 106. When the main contactor coil 502 is energized, the contact 500 has a closed operational position and electrically couples a positive voltage terminal of the battery pack 30 to the electric motor 90. When the main contactor coil 502 is de-energized, the contact 500 has an open operational position and electrically de-couples the positive voltage terminal of the battery pack 30 from the electric motor 90.

The grounding contactor 52 is electrically coupled in series between the battery pack 30 and the electric motor 90. A negative voltage terminal of the battery pack 30 is electrically coupled to a first end of the contact 510 of the main contactor 50 via the electrical line 114. Also, a second end of the contact 510 is electrically coupled to the electric motor 90 via the electrical line 116. When the grounding contactor coil 512 is energized, the contact 510 has a closed operational position and electrically couples a negative voltage terminal of the battery pack 30 to the electric motor 90. When the grounding contactor coil 512 is de-energized, the contact 510 has an open operational position and electrically de-couples the negative voltage terminal of the battery pack 30 from the electric motor 90.

The pre-charge contactor 54 is electrically coupled in parallel to the main contactor 50. A first end of the contact 520 is electrically coupled to the electrical line 102 via the electrical line 104. A second end of the contact 520 is electrically coupled to the electrical line 106 via the resistor 70 and the electrical line 108. When the pre-charge contactor coil 522 is energized, the contact 520 has a closed operational position and electrically couples a positive voltage terminal of the battery pack 30 to the electric motor 90. When the pre-charge contactor coil 522 is de-energized, the contact 520 has an open operational position and electrically de-couples the positive voltage terminal of the battery pack 30 from the electric motor 90.

The current sensor 60 is configured to generate a signal indicative of a total amount of current being supplied by the battery pack 30 to the electric motor 90. The microprocessor 170 receives the signal from the current sensor 60. The current sensor 60 is electrically coupled in series between a positive voltage terminal of the battery pack 30 and a first end of the contact 500.

Referring to FIGS. 1 and 4-7, a flowchart of diagnostic method for the driver circuit 40 of the electric vehicle 10 when the main contactor coil 502, the grounding contactor coil 512, and the pre-charge contactor coil 522 are de-energized will now be explained.

Figure 4:
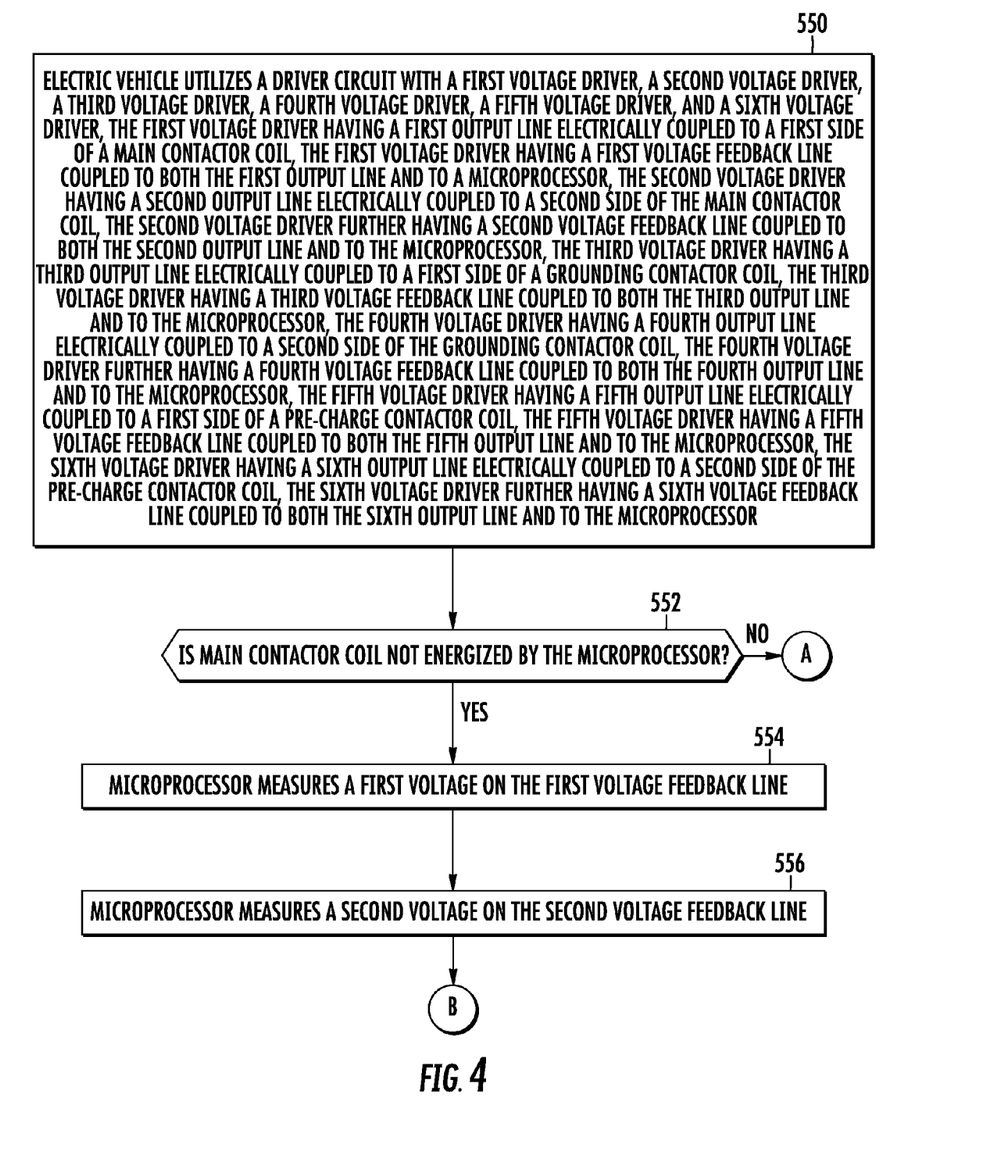
FIGS. 4-7 are flowcharts of a diagnostic method in accordance with another exemplary embodiment.

At step 550, the electrical vehicle 10 utilizes the driver circuit 40 with the first voltage driver 180, the second voltage driver 182, the third voltage driver 184, the fourth voltage driver 186, the fifth voltage driver 188, and the sixth voltage driver 190. The first voltage driver 180 has the first output line 204 electrically coupled to a first side of the main contactor coil 502. The first voltage driver 180 has the first voltage feedback line 206 coupled to both the first output line 204 and to the microprocessor 170. The second voltage driver 182 has the second output line 264 electrically coupled to a second side of the main contactor coil 502. The second voltage driver 182 further includes a second voltage feedback line 266 coupled to both the second output line 264 and to the microprocessor 170. The third voltage driver 184 has a third output line 304 electrically coupled to a first side of the grounding contactor coil 512. The third voltage driver 184 has the third voltage feedback line 306 coupled to both the third output line 304 and to the microprocessor 170. The fourth voltage driver 186 has the fourth output line 364 electrically coupled to a second side of the grounding contactor coil 512. The fourth voltage driver 186 further includes a fourth voltage feedback line 366 coupled to both the fourth output line 364 and to the microprocessor 170. The fifth voltage driver 188 has the fifth output line 404 electrically coupled to a first side of the pre-charge contactor coil 522. The fifth voltage driver 188 has the fifth voltage feedback line 405 coupled to both the fifth output line 404 and to the microprocessor 170. The sixth voltage driver 190 has the sixth output line 464 electrically coupled to a second side of the pre-charge contactor coil 522. The sixth voltage driver 190 further includes the sixth voltage feedback line 466 coupled to both the sixth output line 464 and to the microprocessor 170. After step 550, the method advances to step 552.

At step 552, the microprocessor 170 makes a determination as to whether the main contactor coil 502 is not energized by the microprocessor 170. If the value of step 552 equals "yes", the method advances to step 554. Otherwise, the method advances to step 562.

At step 554, the microprocessor 170 measures a first voltage on the first voltage feedback line 206. After step 554, the method advances to step 556.

At step 556, the microprocessor 170 measures a second voltage on the second voltage feedback line 266. After step 556, the method advances to step 558.

At step 558, the microprocessor 170 sets a first status flag associated with the main contactor 50 equal to a fault condition value if the first voltage is greater than a threshold voltage value. After step 558, the method advances to step 560.

At step 560, the microprocessor 170 sets the first status flag associated with the main contactor 50 equal to the fault condition value if the second voltage is greater than the threshold voltage value. After step 560, the method advances to step 561.

Figure 5:
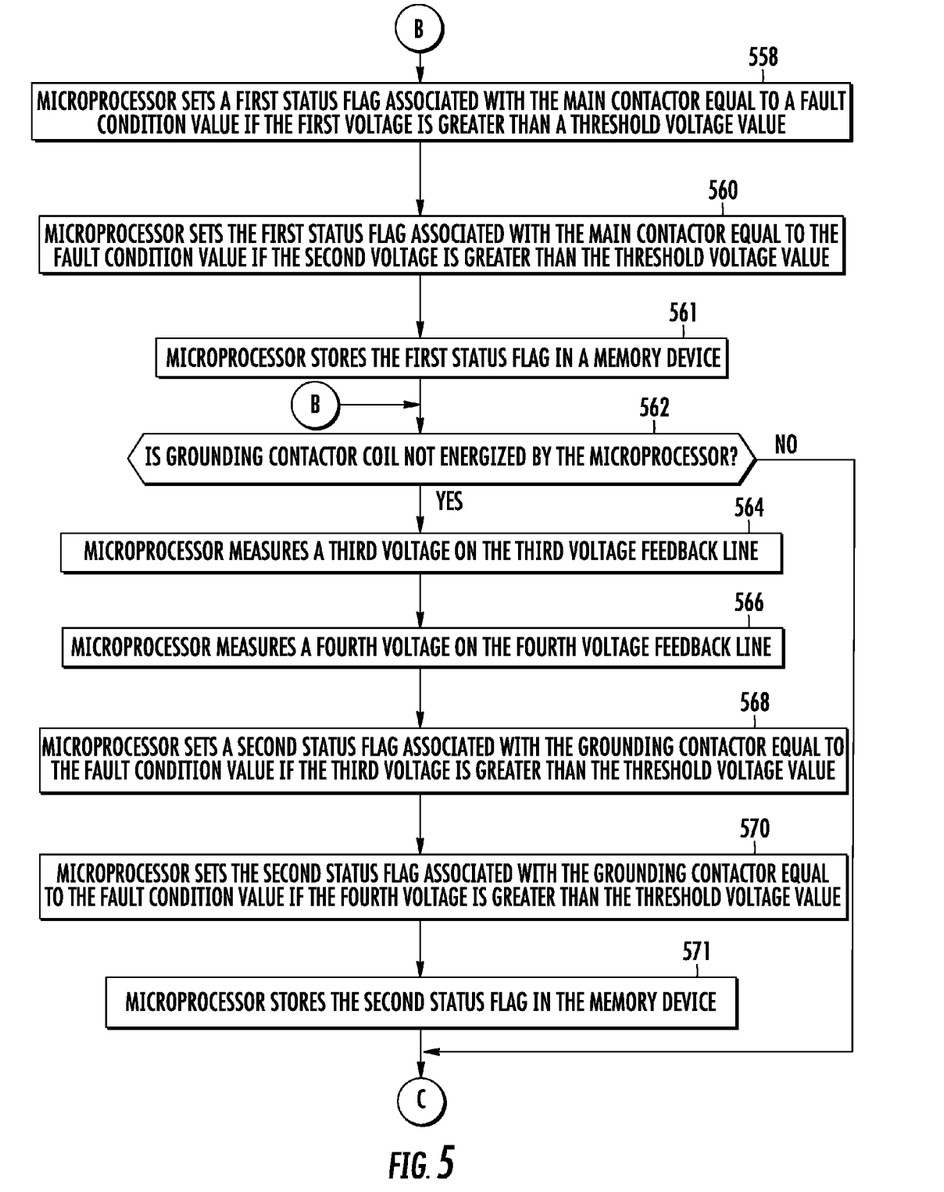

At step 561, the microprocessor 170 stores the first status flag in the memory device 171. After step 561, the method advances to step 562.

At step 562, the microprocessor 170 makes a determination as to whether the grounding contactor coil 512 is not energized by the microprocessor 170. If the value of step 562 equals "yes", the method advances to step 564. Otherwise, the method advances to step 572.

At step 564, the microprocessor 170 measures a third voltage on the third voltage feedback line 306. After step 564, the method advances to step 566.

At step 566, the microprocessor 170 measures a fourth voltage on the fourth voltage feedback line 366. After step 566, the method advances to step 568.

At step 568, the microprocessor 170 sets a second status flag associated with the grounding contactor 52 equal to the fault condition value if the third voltage is greater than the threshold voltage value. After step 568, the method advances to step 570.

At step 570, the microprocessor 170 sets the second status flag associated with the grounding contactor 52 equal to the fault condition value if the fourth voltage is greater than the threshold voltage value. After step 570, the method advances to step 571.

At step 571, the microprocessor 170 stores the second status flag in the memory device 171. After step 571, the method advances to step 572.

Figure 6:
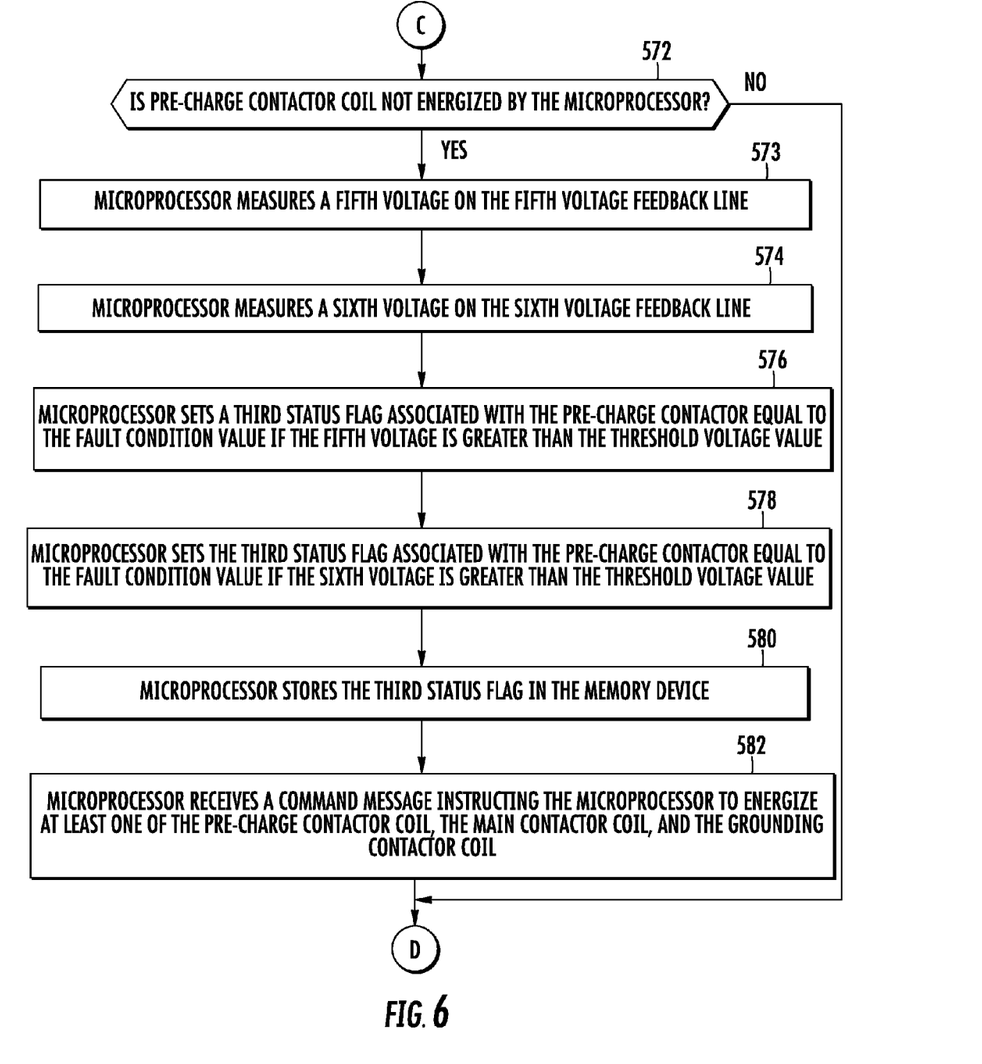

At step 572, the microprocessor 170 makes a determination as to whether the pre-charge contactor coil 522 is not energized by the microprocessor 170. If the value of step 572, equals "yes", the method advances to step 573. Otherwise, the method advances to step 584.

At step 573, the microprocessor 170 measures a fifth voltage on the fifth voltage feedback line 406. After step 573, the method advances to step 574.

At step 574, the microprocessor 170 the measures a sixth voltage on the sixth voltage feedback line 466. After step 574, the method advances to step 576.

At step 576, the microprocessor 170 sets a third status flag associated with the pre-charge contactor 54 equal to the fault condition value if the fifth voltage is greater than the threshold voltage value. After step 576, the method advances to step 578.

At step 578, the microprocessor 170 sets the third status flag associated with the pre-charge contactor 54 equal to the fault condition value if the sixth voltage is greater than the threshold voltage value. After step 578, the method advances to step 580.

At step 580, the microprocessor 170 stores the third status flag in the memory device 171. After step 580, the method advances to step 582.

At step 582, the microprocessor 170 receives a command message from the vehicle controller 117 instructing the microprocessor 170 to energize at least one of the pre-charge contactor coil 522, the main contactor coil 502, and the grounding contactor coil 512. After step 582, the method advances to step 584.

Figure 7:
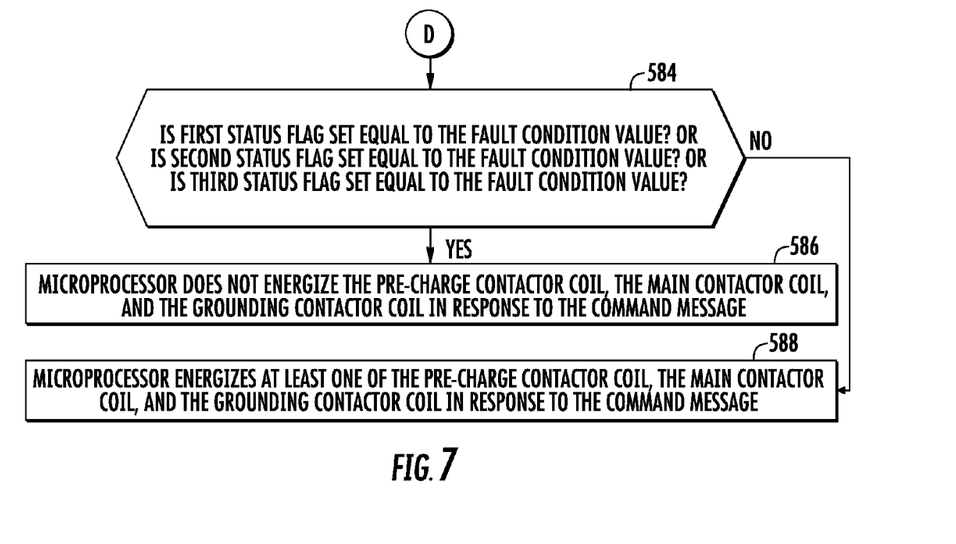

At step 584, the microprocessor 170 makes a determination as to whether the first status flag is set equal to the fault condition value, or whether the second status flag is set equal to the fault condition value or whether the third status flag is set equal to the fault condition value. If the value of step 584 equals "yes", the method advances to step 586. Otherwise, the method advances to step 588.

At step 586, the microprocessor 170 does not energize the pre-charge contactor coil 522, the main contactor coil 502, and the grounding contactor coil 512 in response to the command message. After step 586, the method is exited.

Referring again to step 584, if the value of step 584 equals "no", the method advances to step 588. At step 588, the microprocessor 170 energizes at least one of the pre-charge contactor coil 522, the main contactor coil 502, and the grounding contactor coil 512 in response to the command message. After step 588, the method is exited.

The driver circuit 40 and the diagnostic method provide a substantial advantage over other circuits and methods. In particular, the driver circuit 40 and the diagnostic method provide a technical effect of determining when fault conditions occur in the driver circuit when the driver circuit has de-energized contactor coils.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A driver circuit for an electric vehicle, comprising:
    a first voltage driver having a first output line electrically coupled to a first side of a main contactor coil of a main contactor, the first voltage driver having a first voltage feedback line coupled to both the first output line and to a microprocessor;
    a second voltage driver having a second output line electrically coupled to a second side of the main contactor coil, the second voltage driver further having a second voltage feedback line coupled to both the second output line and to the microprocessor;
    the microprocessor configured to measure a first voltage on the first voltage feedback line if the main contactor coil is not energized by the microprocessor;
    the microprocessor further configured to measure a second voltage on the second voltage feedback line if the main contactor coil is not energized by the microprocessor;
    the microprocessor further configured to set a first status flag associated with the main contactor equal to a fault condition value if the first voltage is greater than a threshold voltage value; and
    the microprocessor further configured to set the first status flag associated with the main contactor equal to the fault condition value if the second voltage is greater than the threshold voltage value.

2. The driver circuit of claim 1, wherein the main contactor has an open operational position when the main contactor coil is not energized, the main contactor having a closed operational position when the main contactor coil is energized.

3. The driver circuit of claim 1, further comprising:
    a third voltage driver having a third output line electrically coupled to a first side of a grounding contactor coil of a grounding contactor, the third voltage driver having a third voltage feedback line coupled to both the third output line and to the microprocessor;
    a fourth voltage driver having a fourth output line electrically coupled to a second side of the grounding contactor coil, the fourth voltage driver further having a fourth voltage feedback line coupled to both the fourth output line and to the microprocessor;
    the microprocessor configured to measure a third voltage on the third voltage feedback line if the grounding contactor coil is not energized by the microprocessor;
    the microprocessor further configured to measure a fourth voltage on the fourth voltage feedback line if the grounding contactor coil is not energized by the microprocessor;
    the microprocessor further configured to set a second status flag associated with the grounding contactor equal to the fault condition value if the third voltage is greater than the threshold voltage value; and
    the microprocessor further configured to set the second status flag associated with the grounding contactor equal to the fault condition value if the fourth voltage is greater than the threshold voltage value.

4. The driver circuit of claim 3, wherein the grounding contactor has an open operational position when the grounding contactor coil is not energized, the grounding contactor having a closed operational position when the grounding contactor coil is energized.

5. The driver circuit of claim 3, further comprising:
    a fifth voltage driver having a fifth output line electrically coupled to a first side of a pre-charge contactor coil of a pre-charge contactor, the fifth voltage driver having a fifth voltage feedback line coupled to both the fifth output line and to the microprocessor;

a sixth voltage driver having a sixth output line electrically coupled to a second side of the pre-charge contactor coil, the sixth voltage driver further having a sixth voltage feedback line coupled to both the sixth output line and to the microprocessor;

the microprocessor configured to measure a fifth voltage on the fifth voltage feedback line if the pre-charge contactor coil is not energized by the microprocessor;

the microprocessor further configured to measure a sixth voltage on the sixth voltage feedback line if the pre-charge contactor coil is not energized by the microprocessor;

the microprocessor further configured to set a third status flag associated with the pre-charge contactor equal to the fault condition value if the fifth voltage is greater than the threshold voltage value; and the microprocessor further configured to set the third status flag associated with the pre-charge contactor equal to the fault condition value if the sixth voltage is greater than the threshold voltage value.

6. The driver circuit of claim 5, wherein the pre-charge contactor has an open operational position when the pre-charge contactor coil is not energized, the pre-charge contactor having a closed operational position when the pre-charge contactor coil is energized.

7. The driver circuit of claim 5, wherein the microprocessor is further configured to store at least one of the first status flag, the second status flag, and the third status flag in a memory device.

8. The driver circuit of claim 1, wherein the microprocessor is further configured to receive a command message instructing the microprocessor to energize the main contactor coil, the microprocessor further configured to not energize the main contactor coil in response to the command message if the first status flag is set equal to the fault condition value.

9. A diagnostic method for a driver circuit for an electric vehicle, the driver circuit having a first voltage driver having a first output line electrically coupled to a first side of a main contactor coil of a main contactor, the first voltage driver having a first voltage feedback line coupled to both the first output line and to a microprocessor, the driver circuit further having a second voltage driver having a second output line electrically coupled to a second side of the main contactor coil, the second voltage driver further having a second voltage feedback line coupled to both the second output line and to the microprocessor, the method comprising:

measuring a first voltage on the first voltage feedback line utilizing the microprocessor, if the main contactor coil is not energized by the microprocessor;

measuring a second voltage on the second voltage feedback line utilizing the microprocessor, if the main contactor coil is not energized by the microprocessor; and setting a first status flag associated with the main contactor equal to a fault condition value utilizing the microprocessor if the first voltage is greater than a threshold voltage value; and setting the first status flag associated with the main contactor equal to the fault condition value utilizing the microprocessor if the second voltage is greater than the threshold voltage value.

10. The method of claim 9, wherein the main contactor has an open operational position when the main contactor coil is not energized, the main contactor having a closed operational position when the main contactor coil is energized.

11. The method of claim 9, wherein the driver circuit further includes a third voltage driver having a third output line electrically coupled to a first side of a grounding contactor coil of a grounding contactor, the third voltage driver having a third voltage feedback line coupled to both the third output line and to the microprocessor, the driver circuit further includes a fourth voltage driver having a fourth output line electrically coupled to a second side of the grounding contactor coil, the fourth voltage driver further having a fourth voltage feedback line coupled to both the fourth output line and to the microprocessor, the method further comprising:

measuring a third voltage on the third voltage feedback line utilizing the microprocessor, if the grounding contactor coil is not energized by the microprocessor;

measuring a fourth voltage on the fourth voltage feedback line utilizing the microprocessor, if the grounding contactor coil is not energized by the microprocessor; and setting a second status flag associated with the grounding contactor equal to the fault condition value utilizing the microprocessor if the third voltage is greater than the threshold voltage value; and setting the second status flag associated with the grounding contactor equal to the fault condition value utilizing the microprocessor if the fourth voltage is greater than the threshold voltage value.

12. The method of claim 11, wherein the grounding contactor has an open operational position when the grounding contactor coil is not energized, the grounding contactor having a closed operational position when the grounding contactor coil is energized.

13. The method of claim 11, wherein the driver circuit further includes a fifth voltage driver having a fifth output line electrically coupled to a first side of a pre-charge contactor coil of a pre-charge contactor, the fifth voltage driver having a fifth voltage feedback line coupled to both the fifth output line and to the microprocessor, the driver circuit further includes a sixth voltage driver having a sixth output line electrically coupled to a second side of the pre-charge contactor coil, the sixth voltage driver further having a sixth voltage feedback line coupled to both the sixth output line and to the microprocessor, the method further comprising:

measuring a fifth voltage on the fifth voltage feedback line utilizing the microprocessor, if the pre-charge contactor coil is not energized by the microprocessor;

measuring a sixth voltage on the sixth voltage feedback line utilizing the microprocessor, if the pre-charge contactor coil is not energized by the microprocessor; and setting a third status flag associated with the pre-charge contactor equal to the fault condition value utilizing the microprocessor if the fifth voltage is greater than the threshold voltage value; and setting the third status flag associated with the pre-charge contactor equal to the fault condition value utilizing the microprocessor if the sixth voltage is greater than the threshold voltage value.

14. The method of claim 13, further comprising storing the first status flag, the second status flag, and the third status flag in a memory device utilizing the microprocessor.

15. The method of claim 9, further comprising:

receiving a command message at the microprocessor instructing the microprocessor to energize the main contactor coil; and not energizing the main contactor coil utilizing the microprocessor in response to the command message if the first status flag is set equal to the fault condition value.

* * * * *